April 18, 1961 W. L. FRONK 2,979,827
CAPSULE ASSEMBLY GAGE
Filed Dec. 16, 1957
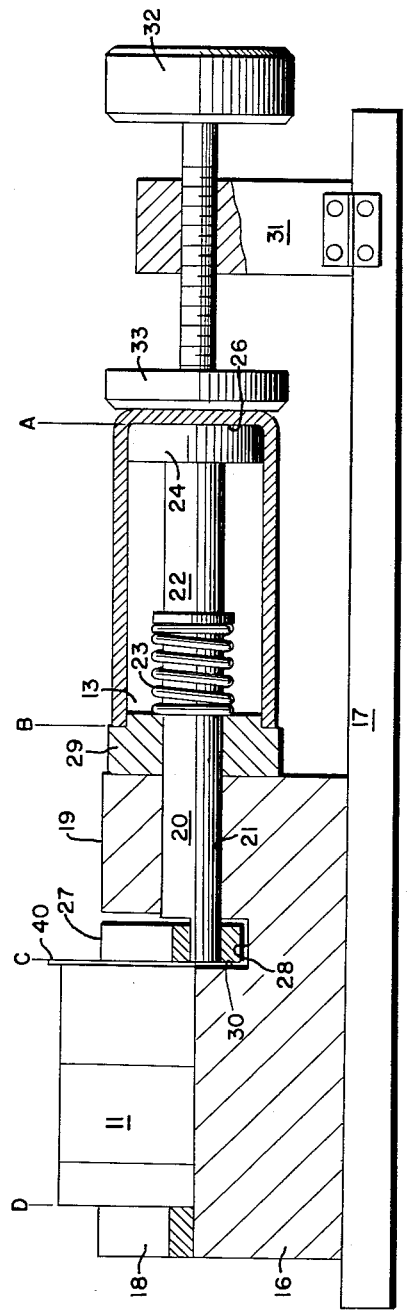
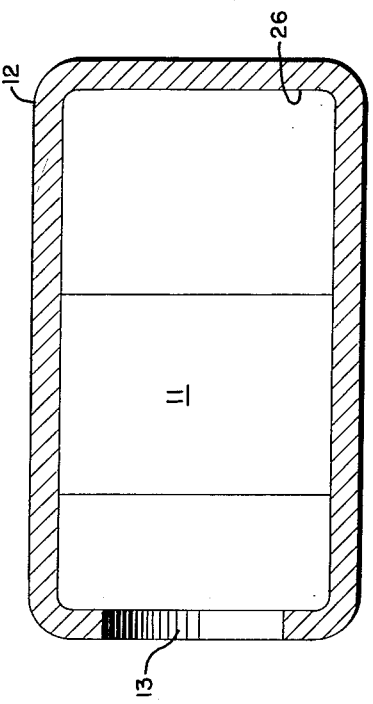
INVENTOR.
WILBERT L. FRONK
ATTYS.

United States Patent Office 2,979,827
Patented Apr. 18, 1961

2,979,827

CAPSULE ASSEMBLY GAGE

Wilbert L. Fronk, Springfield, Pa., assignor, by mesne assignments, to the United States of America as represented by the Secretary of the Navy Filed Dec. 16, 1957, Ser. No. 703,229

4 Claims. (Cl. 33—174)

This application relates to an assembly gage; more particularly to a gage suitable for determining whether a capsule comprising a component assembly housing is suitable for encasing a particular assembly.

In the manufacture of electronic devices or the like it is sometimes necessary to encase the delicate electronic apparatus within an open ended casing or sleeve, referred to herein as a capsule, and then crimp the ends of the casing to form a snug package. Space being at a premium in such devices, the length of the casing and the electronics therein must be maintained within certain close tolerances. Accordingly, the electronic apparatus often must be fitted to a particular casing. That is to say, the length of a given casing must exceed the length of the electronic assembly to be encased by a particular amount to insure a proper compressive load on the assembly. Otherwise the component assembly and casing would neither fit properly in their designated places nor function properly by reason of loosely fitting within the capsule or as the result of damage to the components within the capsule caused by excessive pressure during the crimping operation.

In the assemblying operations heretofore employed for encasing such devices within a capsule, it was necessary to measure the component assembly and the capsule or housing and, by subtracting their respective lengths, determine if they would fit with the proper amount of housing overhang for proper crimping. This procedure is tedious and many times the operator apparently overcome by boredom and apathy, commits careless errors in the measurements or in the subtraction process involved in determining the proper size of casing.

Accordingly, it is an object of this invention to provide a new and improved gage for determining if a casing and an assembly to be inserted therein are of proper relative length or depth.

Another object is the provision of a new and improved gage for determining with a minimum of measurements if an assembly of undetermined length is suitable for crimping encasement in a container of undetermined length.

Another object is to provide a new and improved gage which will indicate whether that the depth of a casing falls within allowed tolerances.

These and many other objects will become more readily apparent when the following description is read in the light of the accompanying drawing wherein:

Fig. 1 is a horizontal elevational view, partly in section, of a gage embodying the principles of this invention; and Fig. 2 is a view, partly in section, of the electronic assembly and the container.

Referring now to the drawing in which like numerals of reference are employed to designate like or similar parts throughout the several views thereof, for a more complete understanding of the invention, there is shown thereon an assembly illustrated generally at 11 adapted to be inserted into a container 12. It is necessary that the open end 13 of the container or casing be crimped after the assembly is inserted in order to hold the assembly securely in place within the casing during the condition of service without damage to the assembly. The casing is crimped over along the peripheral line defined by the end of the assembly 11 when it is in place within the casing so that the amount of overhang of the crimped portion is determined by the difference in length between the assembly 11 and the casing 12, allowing of course for the thickness of the casing wall. In order to maintain the amount of crimping within the close tolerances allowed, this invention provides a semi-automatic gage for matching the depth of the container with the length of the assembly.

As is clearly shown on Fig. 1, the gage is composed of a main body portion 16 mounted on a bed 17. At one end of body 16 is formed a fixed V-shaped stop block 18 while an enlarged boss 19 is formed integral with the body at its opposite end. Slidably fitted within a central bore 21 in the boss 19 is a double ended rod 22 which is normally urged upwardly as shown in Fig. 1 by the biasing spring 23. An enlarged head or anvil 24 is formed integral with one end of rod 22 and is adapted to seat against the bottom 26 of container 12 while a second V block 27 is secured to the opposite end 20 of rod 22. The upper portion of the block 27 cooperates with the fixed block 18 in a manner which will become more clearly apparent as the description proceeds, while the lower portion fits within the enlarged recess 28 to permit only limited reciprocation of rod 22.

A fixed annular stop ring 29 is disposed about rod 22 and is secured to the boss 19 as shown in the drawings. The rod 22 and the body 16 are carefully machined and the thickness of stop ring 29, boss 19 and block 27 are selected so that the distance between stop 29 and the enlarged head 24 exceeds the distance between the fixed block 18 and the block 27 by exactly the permissible minimum length of the crimping. Accordingly, if the crimping must be at least .010″ and not more than .025″, the distance between A and B will be .010″ longer than the distance between C and D.

Furthermore, the length of the recess 28 may advantageously be such that when block 27 abuts the left wall 30 of this recess, the distance A—B is equal to the minimum permissible length of the casing. Therefore, if the anvil is moved as far to the left as is possible and the end of casing 12 fails to touch the appropriate surface of annular stop ring 29, the casing should be rejected as too short. Conversely, the length of the rod 22 may be selected so that if the open end 13 of casing 12 abuts stop ring 29 before the bottom of the casing touches the head 24 of the anvil, the casing is rejected as too deep. These last named features are optional but highly desirable since the separate operation of checking the length of the casing may be eliminated and combined with this operation when these features are included in the gage.

*Operation*

The casing 12 is placed over rod 22 so that the anvil fits snugly against the bottom 26 of the container. If the casing takes the form of a sleeve to be crimped at one or both ends, the anvil will seat against an appropriate bottom shoulder in the container. The container is then urged to the left against the force of spring 23 until the open end 13 of the container abuts the stop ring 29 thereby moving the block 27 to the left if casing 12 is within tolerances.

The hinged latch 31 may be moved into position in axial alignment with the rod 22 and the thumb screw 32 rotated until the enlarged end 33 thereof abuts the end of the casing 12 to urge the open end 13 against ring 29. The latch gate need not be used and if the operator chooses, he may manually restrain the casing in position. Any component assembly that can now be inserted between blocks 18 and 27 is not too large to allow sufficient overhang of the crimped portion of the casing 12. However, if a feeler gage 40 barely larger than the maximum permissible value of overhang minus the minimum permissible value of overhang of the crimped portion can be inserted between one end of the assembly 11 and block 27 as its opposite end abuts block 18, the assembly is too small for the casing being tested and another assembly must be used.

For example, if the casing must be crimped at least .010" and not more .025", the distance between A and B is .010" greater than line C—D and a .016" feeler gage is used to determine if the space between block 27 and the assembly 11 is excessive.

Although this invention has been described with reference to but one embodiment thereof it is not so limited as it is susceptable of many alterations and modifications without departing from the spirit or scope thereof. Accordingly, the extent of this invention is to be determined only by the scope of the appended claims.

What is claimed as new and desired to be secured by Letters Patent of the United States is:

1. A gage for inspecting a casing having an open end and for matching the casing to an assembly to be fitted therein which comprises; a body having a stop block fixed at one end and an annular stop ring at the opposite end, said body having a recess formed therein intermediate the stop block and the stop ring, said ring adapted to receive the open end of a casing being inspected, a rod slidably disposed through said stop ring and adapted to be inserted within a casing being inspected, an anvil formed at one end of said rod to abut the bottom of the casing being measured whereby said ring and said rod form a casing measuring portion of the gage, an enlarged block secured to the opposite end of the rod and operating within the recess in said body, said stop block and the block secured to said rod together defining an assembly measuring portion operable by the casing measuring portion so that when the open end of the casing being inspected engages the annular stop plate and said anvil abuts the bottom of the casing the distance between said blocks is equal to the permissible maximum length of an assembly matching the casing.

2. The gage of claim 1 further including spring biasing means in engagement with said rod for urging the anvil into abutment with the bottom of the casing being measured.

3. The gage of claim 1 wherein said rod and the recess are of such lengths that when said enlarged block is at one end of the recess the distance between said annular stop plate and the remote end of the anvil is equal to the maximum length for a casing and when the enlarged block is at the opposite end of the recess, the distance between said annular stop plate and the remote end of said anvil is equal to the minimum length of a casing.

4. A gage for measuring the depth of a casing and simultaneously indicating whether an assembly to be encased therein is of the proper size comprising; a body portion, casing stop means fixed to said body portion for abutting one end of the casing to be measured, elongated casing measuring means having a first end portion slidably carried by said body portion and having a second end portion extending outwardly of said body portion through said casing stop means for engaging the other end of the casing to be measured, said casing stop means and said elongated casing measuring means together defining a casing measuring portion of the gage, casing measuring abutment means formed in said body portion for abutting said first end portion of said elongated casing measuring means, said casing measuring abutment means being spaced from said second end portion of said elongated casing measuring means by a selected distance such that a casing of insufficient depth cannot be brought into abutment with said casing stop means, first assembly stop means fixed to said casing measuring means and movable therewith, second assembly stop means fixed to said body portion at a selected distance from said first assembly stop means and together therewith defining an assembly measuring portion of the gage for simultaneous use with said casing measuring portion of the gage.

References Cited in the file of this patent

UNITED STATES PATENTS

| | | |
|---|---|---|
| 2,238,887 | King | Apr. 22, 1941 |
| 2,337,690 | Stern | Dec. 28, 1943 |
| 2,426,955 | Stroup | Sept. 2, 1947 |
| 2,466,185 | Stoothoff | Apr. 5, 1949 |
| 2,502,613 | Zanolio | Apr. 4, 1950 |
| 2,667,700 | Pistoles | Feb. 2, 1954 |

FOREIGN PATENTS

| | | |
|---|---|---|
| 554,316 | Great Britain | June 29, 1943 |